United States Patent [19]
Gyugyi et al.

[11] 4,001,670
[45] Jan. 4, 1977

[54] STATIC REACTIVE POWER GENERATING APPARATUS

[75] Inventors: Laszlo Gyugyi; John Rosa; Eric J. Stacey, all of Pittsburgh, Pa.

[73] Assignee: Westinghouse Electric Corporation, Pittsburgh, Pa.

[22] Filed: May 8, 1975

[21] Appl. No.: 575,888

[52] U.S. Cl. .............................. 323/108; 321/66; 323/119
[51] Int. Cl.² .................................... H02J 3/18
[58] Field of Search ................ 321/5, 7, 27 R, 61, 321/65, 66, 69 R; 323/101, 102, 105, 108–111, 119, 127, 128

[56] References Cited
UNITED STATES PATENTS 3,858,105   12/1974   Gyugyi ................ 321/66

OTHER PUBLICATIONS

Frank et al., "Power–Factor Correction with Thyristor Controlled Capacitors", ASEA Journal 1971, vol. 44, No. 6, pp. 180–184, s26450038, 323–119.

*Primary Examiner*—A. D. Pellinen
*Attorney, Agent, or Firm*—C. M. Lorin

[57] ABSTRACT

An AC/AC frequency changer operating under a one to one frequency ratio has its input coupled to a power system of same frequency and voltage, with an inductor connected between its output and input terminals. The output voltage is controlled so as to deviate by a predetermined amount from the input voltage so that reactive power flows from the output to the input which, owing to the inherent phase inversion in the frequency changer, causes reactive input current and reactive output current to be summed up directly at the input terminals. As a result, the frequency changer requires only a power rating which is half the reactive power which it can supply to the power system.

7 Claims, 14 Drawing Figures

STATIC REACTIVE POWER GENERATING APPARATUS

BACKGROUND OF THE INVENTION

There has been in recent years an increased demand for power factor correction and control in utility and industrial power systems due to the growing use of electrical machines, the major role of the electric arc furnace in steel production and the general acceptance of thyristor drives and power controllers in the industry. As a result, controlled generation of reactive power for improving the line power factor has become of major importance, which can be achieved most successfully through the use of static power switches, for instance thyristors. It has been established that static VAR generators in most applications provide superior performance at lower cost than conventional rotating synchronous condensers.

There are three basic modern methods of generating reactive power (VAR) all using static control of thyristors: (1) thyristor controlled shunt capacitors and inductors; (2) AC/DC converters and inverters; (3) AC/AC frequency changers.

The present invention relates to the third category of static VAR generators, namely to AC/AC frequency changers used for the generation of reactive power.

The AC/AC frequency changer is itself divided in several categories according to the mode of control, the range of control, and the inherent properties of the apparatus in operation. A first distinction is made between frequency changers in which the thyristors are force commutated and those in which the thyristors are naturally commutated by the voltages of the input source. Two inherent characteristics of a frequency changer using thyristors for conversion are: (1) the frequency relation between the input alternating current and the output alternating current (2) the phase relation between current and voltage at the input and at the output e.g. the displacement power factor. In converters of the naturally commutated type the displacement power factor of the current drawn at the input is lagging and is a function of the displacement power factor of the output current. It is possible by force commutation to control the input displacement power factor and in particular, to bring it automatically to unity. This is not possible with a naturally commutated frequency changer. Another particularity of frequency changers is that an alternating current sinusoidal wave of a desired frequency is generated by controlled conduction of the thyristors. The time and frequency of conduction of the thyristors is generally variable along the reference waveform used to build the output waveform. In one case, however, equal time intervals of conduction are caused by force commutation to occur in an array of thyristors and the derived output frequency is equal to the difference between the switching rate of the thyristors and the frequency of the input current. This particular type of frequency changer is called an Unrestricted Frequency Changer (UFC) because any output frequency can be generated for any input frequency merely by selecting the switching rate, whereas in the other types of frequency changers, the output frequency has to be lower than the input frequency, although with one exception, the naturally commutated cycloconverter in a particular instance when it is purely reactively loaded.

It has already been proposed to use a frequency changer in order to generate corrective reactive power to a power system. See for instance U.S. Pat. No. 3,858,105 entitled "Static Power Conversion Arrangement and Method" of L. Gyugyi.

It is desirable to be able to generate reactive power with apparatus of the appropriate rating as well as with due regard to technical requirement and cost objectives. In that respect, all reactive power generators in the prior art under any of the three basic methods have required the use of apparatus having a rating at least equal to the maximum VA power required for effective displacement power factor correction on the utilization line. In other words, the utilization of the reactive power sources of the prior art is one per unit (1 P.U.).

An object of the present invention is to provide a reactive power generator capable of compensating the power factor of a line with a VA rating which is less than the required reactive power.

Another object of the present invention is to provide an AC/AC frequency changer having an effective power rating which is larger than its inherent VA rating.

An object of the present invention is also to generate either inductive, or capacitive, reactive power from an AC/AC frequency changer as required to compensate for power factor displacement in a utilization line.

Static frequency changers offer a unique mode of generating reactive power. In that respect they provide an interesting alternative for AC/DC converters, and for inverters, which also are capable under proper operative conditions of generating reactive power. In all such instances, practically the reactive power generator must be operated in an essentially balanced multiphase system. However, these types of generators not only perform generally as well as any rotating synchronous condensers under steady state conditions, but also have proved to be superior for transient response.

SUMMARY OF THE INVENTION

The present invention provides a novel and unique way of generating reactive power with an AC/AC frequency changer for compensating reactive currents drawn by the reactive load in a power system. The gist of the invention resides in using as a reactive power generator a frequency changer operated with the same frequency as the power system at both its input and output so that the frequency ratio actually is one; wherein the input is coupled to the power system and the output is also connected to the power system, but through an inductance. In addition, the frequency changer is so chosen that it inherently inverts the phase angle of the throughput current with regard to the respective input and output terminal voltage. As will be shown hereinafter, with such an arrangement whenever the load appears inductive at one of the terminals the load will appear capacitive at the other of the terminals, and conversely. Frequency changers that can invert the phase angle of the reactive current between input and output may be of the force commutated as well as of the naturally commutated type.

Thus, it is essential to select a converter circuit that exhibit an input phase angle which is always the opposite of the output phase angle, and in which the frequency at the input and output terminals is the same as the frequency of the input source, e.g. the power system.

In operation, the input of the frequency changer will appear to the AC power system as an inductor, while at the output of the frequency changer the current will appear as capacitive. Similarly, if at its input the static frequency changer appears to the AC power system as a capacitor, the AC power system will look as an inductive load from the output of the static frequency changer.

The current, as seen by the static frequency changer at its output is, however, opposite in nature to the same current as seen from the AC power system. Therefore, considered from the AC power system, the reactive currents flowing to the input and output sides of the static frequency changer are of the same phase and, accordingly, add up directly to a magnitude of twice the throughput current of the frequency changer, i.e. providing two per unit (2 P.U.) reactive current to the AC power system, as will be apparent from the description of the preferred embodiment of the invention, hereinafter.

DESCRIPTION OF THE PREFERRED EMBODIMENT

Figure 1:
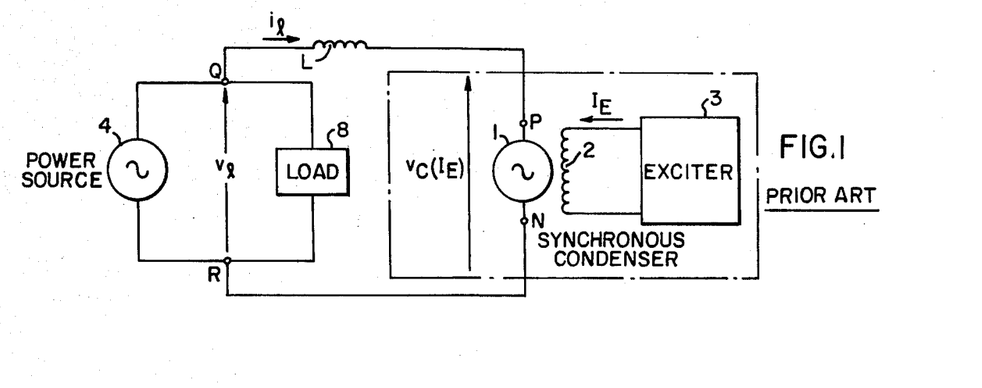
FIG. 1 illustrates reactive power compensation with a synchronous condenser of the prior art.

Before considering the static frequency changer modified according to the present invention to provide a generator of reactive power than can be coupled to an AC power system in order to compensate for the displacement factor of the power system, reference is made first to FIG. 1 illustrating the operation of a conventional reactive power source, typically a rotating synchronous condenser. The synchronous condenser includes a rotating armature 1 and an excitation winding in which passes a field current i.e., controlled by an exciter 3. The voltage at the terminals P,N of the armature is $v_C(I_E)$ and it varies with the field current $I_E$.

Terminal P is connected to a power line at Q via an indicator L. Terminal N is directly connected at R to the power line. The voltage between terminals Q and R is $v_l$, and current from the reactive power generator is $i_l$. The power line is supplied with alternating current from a power source 4, and the supplied energy is carried by a load 8. With such schematic representation of a reactive power generator coupled to a power system, as generally known, the phase relation between current and voltage at the output terminals Q,R of the reactive power generator establishes itself as follows: If $v_C(I_E) = v_l$ then, $i_l = 0$. Since no current is supplied by the reactive power generator at terminals Q,R there is no power factor correction. If, however, $v_C(I_E) > v_l$, then $i_l$ leads $v_l$, and capacitive reactive power is supplied by the reactive power generator to the power system. If $v_C(I_E) < v_l$, then $i_l$ lags $v_l$ and inductive power is supplied by the reactive power generator to the power system.

Another way of looking at the operation of the reactive power generator is to consider that when between input terminals Q,R the reactive power generator is seen as inductive, from the output terminals P,N the power line is seen as capacitive, and conversely.

Figure 2:
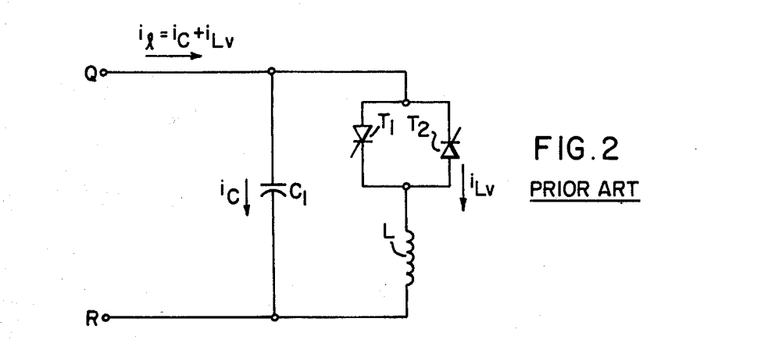
FIG. 2 shows a phase controlled static switch used as a source of reactive power in the prior art.

FIG. 2 illustrates, as another prior source of reactive power, a phase-controlled static switch. Typical in such phase-controlled static switch is the use of a fixed capacitor $C_1$, and a thyristor-controlled ($T_1$, $T_2$) variable inductor L automatically adjusted in response to detected reactive power changes in the outside load so as to provide, in each phase, reactive power during each successive half cycle of the AC source, thereby to insure that the AC power system sees a balanced load at a basically fixed power factor. Such a system is disclosed in copending patent application Ser. No. 535,629 filed Dec. 23, 1974 of L. Gyugyi and M. B. Brennen entitled "Method and Control Apparatus for Static VAR Generator and Compensator".

Figure 3:
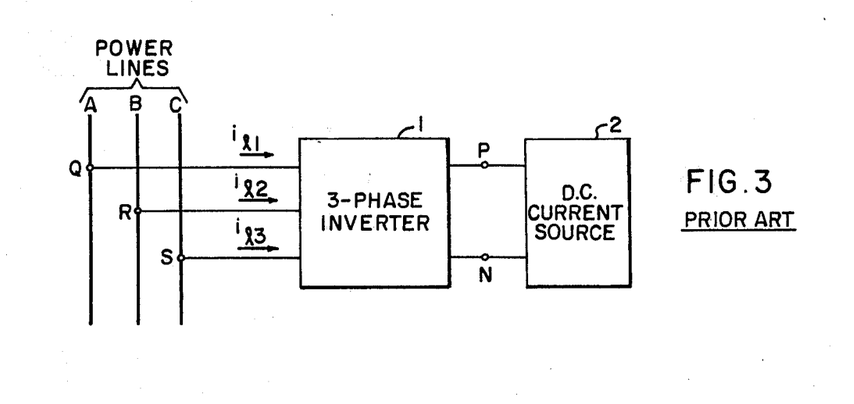
FIG. 3 shows the current-fed static inverter as another prior source of reactive power.

FIG. 3 illustrates a third prior reactive power generator, namely a current fed static inverter, shown here as interconnected between a DC current source input and terminals P,N, and a three-phase power line having output terminals Q,R,S.

Figure 4A:
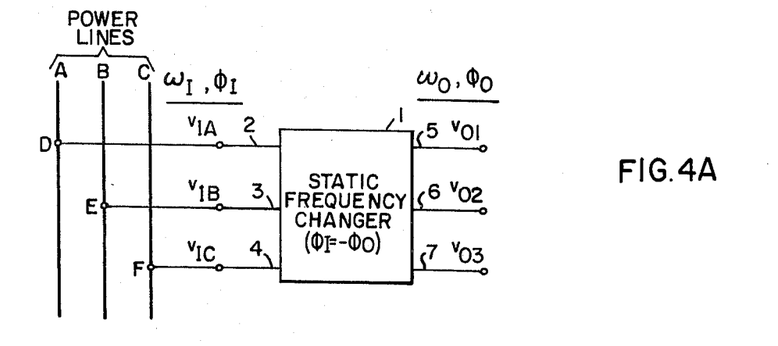
FIG. 4A shows a static frequency changer connected to the power lines of a power system.
Figure 4B:
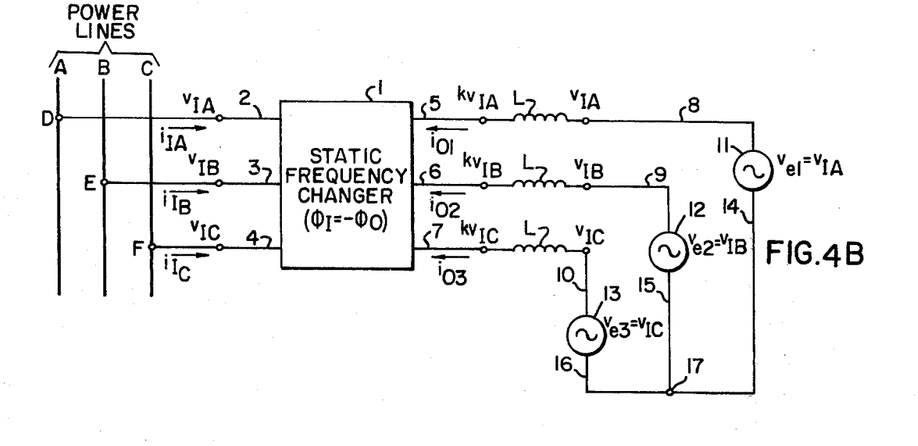
FIG. 4B shows the static frequency changer of FIG. 4A arranged to satisfy specific basic conditions prescribed in accordance with the present invention.
Figure 4C:
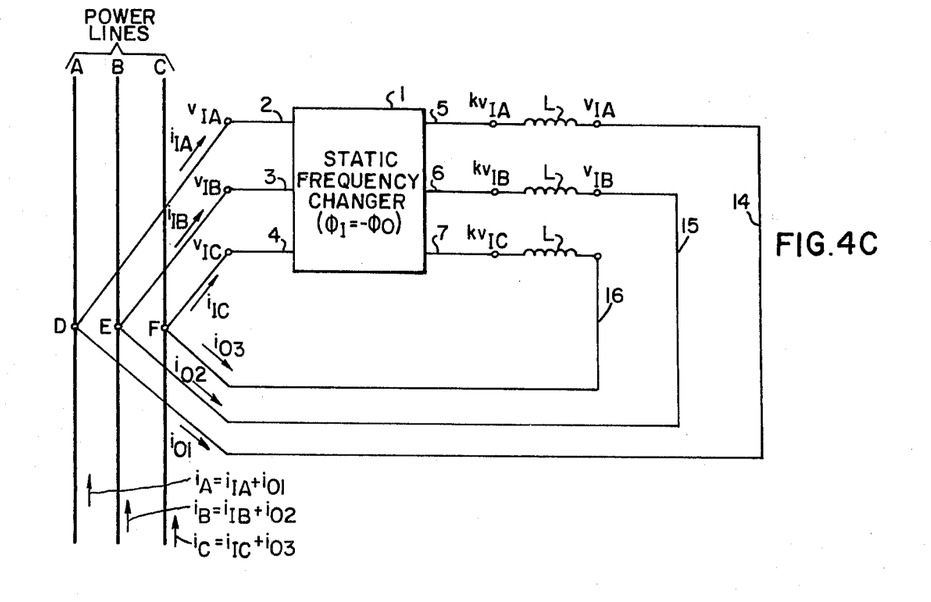
FIG. 4C illustrates a practical adaptation of the static frequency changer arrangement of FIG. 4B.

Referring now to FIGS. 4A, 4B, 4C, the operation of a converter so-designed as to satisfy the conditions hereabove prescribed, will hereinafter be described for the sake of illustration in the context of a static frequency changer converting the three phase voltages of a power line ($v_{IA}$, $v_{IB}$, $v_{IC}$) into three phase output voltages ($v_{01}$, $v_{02}$, $v_{03}$).

It is assumed that the frequency changer of FIG. 4A can be operated under the following conditions:

1. The angular input frequency, $\omega_I$, is equal to the generated angular output frequency, $\omega_0$.

2. The fundamental components of the generated output voltages $v_{01}$, $v_{02}$, and $v_{03}$ are in phase with the respective input voltages $v_{IA}$, $v_{IB}$ and $v_{IC}$.

3. The amplitude of the output voltages is variable with respect to the essenially fixed amplitude of the input voltages.

4. The input phase angle, $\phi_I$, (i.e., the phase angle between the input phase voltage and current) is the negative of the output phase angle, $\phi_0$, (i.e., the phase angle between the fundamental components of the output voltage and output current waves).

With the above stipulations, the following relationships exist between the input and output parameters:

$$v_{01_F} = k\ v_{IA} = k\ V_I \sin \omega_I t$$

$$v_{02_F} = k\ v_{IB} = k\ V_I \sin\left(\omega_I t - \frac{2\pi}{3}\right)$$

$$v_{03_F} = k\ v_{IB} = k\ V_I \sin\left(\omega_I t - \frac{4\pi}{3}\right)$$

and $$i_{IA_F} = I_I \sin(\omega_I t + \theta_I) = I_o \sin(\omega_I t - \theta_o)$$

$$i_{IB_F} = I_I \sin\left(\omega_I t - \frac{2\pi}{3} + \theta_I\right) = I_o \sin\left(\omega_I t - \frac{2\pi}{3} - \theta_o\right)$$

$$i_{IC_F} = I_I \sin\left(\omega_I t - \frac{4\pi}{3} + \theta_I\right) = I_o \sin\left(\omega_I t - \frac{4\pi}{3} - \theta_o\right)$$

where:

$v_{01}$, $v_{02}$ and $v_{03}$ are the fundamental components of the generated output voltage waves.

$v_{IA}$, $v_{IB}$ and $v_{IC}$ are the three input (line) voltages, $V_I$ is the amplitude of the input (AC power system) voltages, $\omega_I$ is the angular frequency of the input voltages, K is the amplitude ratio of the output and input voltages, $k = V_o/V_I$, ($k>0$), $i_{IA}$, $i_{IB}$ and $I_{IC}$ are the fundamental components of the input current waves, $I_I$ is the amplitude of the fundamental input current, $I_o$ is the amplitude of the fundamental output current, $\phi_o$ is the output phase angle, $\phi_I$ is the input phase angle, $\phi_I = -\phi_o$, $\phi_o = -\phi_I$ It is assumed first that the outputs of the frequency changer are connected to a three-phase external voltage source, (which can actually be another power system) via three inductors as shown in FIG. 4B. It is further assumed that the external voltage source is perfectly synchronized in phase and amplitude with the AC power lines (input source). Looking at the terminals of the external voltage source, the frequency changer when supplied from the AC can act exactly as a conventional rotating synchronous condenser. That is to say, whenever K>L, the frequency changer supplies reactive VA for the external source (i.e., the external source is capacitively loaded) and whenever $k<1$ ($k>0$) the frequency changer absorbs reactive (i.e., the external source is inductively loaded) VA which is then supplied by the external source. This will appear more clearly from the following:

When $k > 1$, the output voltages of the frequency changer ($kv_{IA}$, $kv_{IB}$, $kv_{IC}$) are higher than the corresponding voltages of the external source ($v_{e1} = v_{IA}$, $v_{e2} = v_{IB}$, $v_{e3} = v_{IC}$), therefore purely reactive currents will flow from the outputs of the frequency changer to the external source. These currents lag the corresponding output voltages of the frequency changer and lead those of the external source. In other words, in the case of $k>1$, the frequency changer is inductively loaded while the external source is capacitively loaded. Similarly, whenever $k<1$, the output voltages of the frequency changer are lower than the external source voltages, and inductive reactive currents will flow from the external source to the frequency changer output.

These currents lead the output voltages of the frequency changer and lag those of the external source. Thus, in this second situation, the frequency changer is capacitively loaded while the external source is inductively loaded.

Similarly, and as earlier explained, whenever $k = 1$, no current flows at the fundamental frequency. However, in actuality there will be a small amount of "ripple" current. In any case, the frequency changer neither supplies nor absorbs reactive VA.

It is necessary now to consider how the fundamental input currents, $i_{IA}$, $i_{IB}$ and $i_{IC}$, drawn by the frequency changer from the AC lines, are affected in each of the considered cases, namely $k>1$, $k<1$, and $k = 1$.

In this respect, referring to FIG. 4B, as earlier explained whenever $k>1$ the output currents of the frequency changer lag the corresponding output voltages, i.e., the output phase angle, $\phi_o$ is $-90°$. It has been stated previously that the frequency changer employed has the property of reflecting the negative of the output phase angle to the input, i.e., the input phase angle, $\phi_I$, is equal to $-\phi_o$, thus, $\phi_I = -\phi_I = -\phi_o = +90°$. Consequently, the input currents $i_{IA}$, $i_{IB}$, and $i_{IC}$ lead the corresponding AC line voltages, $v_{IA}$, $v_{IB}$ and $v_{IC}$, by 90°.

Similarly, when $k<1$, the output currents lead the output voltages of the frequency changer, i.e., the output phase angle, $\phi_o$ is $+90°$. Due to the output/input phase angle inverting property of the frequency changer, the input currents now lag the AC supply voltages, i.e., $\phi_I$ 32 $-\phi_o = -90°$.

At $k = 1$, the fundamental components of the input currents are obviously zero, since the frequency changer supplies no current at the outputs.

On the basis of the above discussion, it can be concluded that whenever $k>1$, the currents in the AC lines, as well as in the external source, lead the corresponding voltages by 90° (i.e., both the AC lines and the external source are capacitively loaded). Similarly, whenever $k < 1$, the currents in the AC lines, as well as in the external source, lag the corresponding voltages by 90° (i.e., both the AC lines and external source are inductively loaded).

In the light of the preceding analysis of an hypothetical situation, the gist of the present invention can now be more readily understood by reference to FIG. 4C. The conditions are still that the voltages of the three-phase external source are perfect replicas of the AC line voltages. Thus: $v_{e1} = v_{IA}$, $v_{e2} = v_{IB}$ and $v_{e3} = v_{IC}$. It follows that the above stated current/voltage relationships will not change if the outputs of the frequency changer are removed from the hypothetical external source and directly connected, instead, to the AC lines as shown in FIG. 4C. Since both the input and the output currents of the frequency changer can simultaneously be made to lead, or lag, the AC line voltages, it is clear that the total reactive current drawn from the lines will be the sum of these currents, i.e., $i_A = i_{IA} + i_{o1}$, $i_B = i_{IB} + i_{o2}$, and $i_C = i_{IC} + i_{o3}$. Therefore, the total reactive VA provided for the AC lines is:

$$(VA)_L = 3V_L I_L = 3V_L (I_{I_{rms}} + I_{o_{rms}})$$

where:

$V_L$ is the rms value of the line-to-neutral voltage applied to the inputs of the frequency changer;

$I_L$ is the rms value of the line current;

$I_{I_{rms}}$ is the rms value of the input current of the frequency changer; and $I_{o_{rms}}$ is the rms value of the output current of the frequency changer.

The input and output currents can be made approximately equal by keeping $k$ close to unity, which requires L to be small.

Inductor L should be kept small in order to minimize the voltage drop at the fundamental frequency across the inductor. On the other hand, L should be large enough to reduce the ripple currents caused at a higher frequency by the static converter. In practice, the value of L will depend upon the pulse number of the converter. Usually the voltage drop across the inductor will be only a few percent of the converter output voltage, so that it can be ignored from the following approximate relationships:

$$(VA)_L = 3V_L I_L = 3V_L(2I_{t_{rms}}) = 3V_L(2I_{o_{rms}})$$

On the other hand, the VA rating, or throughput, of the static frequency changer is:

$$(VA)_{FC} = 3V_t I_t$$

which brings;

$$(VA)_{FC} = \tfrac{1}{2} (VA)_L$$

from which it appears that the VA rating, or throughput $(VA)_{FC}$, of the proposed reactive power generator is only the half of the maximum VAR provided for the AC lines.

Since by control of the static frequency changer it is possible to give $k$ any value under or above 1, it is seen that the total VAR generated can be varied continuously from maximum lagging to maximum leading VAR through control, internally, of the output voltage of the static frequency changer.

Figure 5:
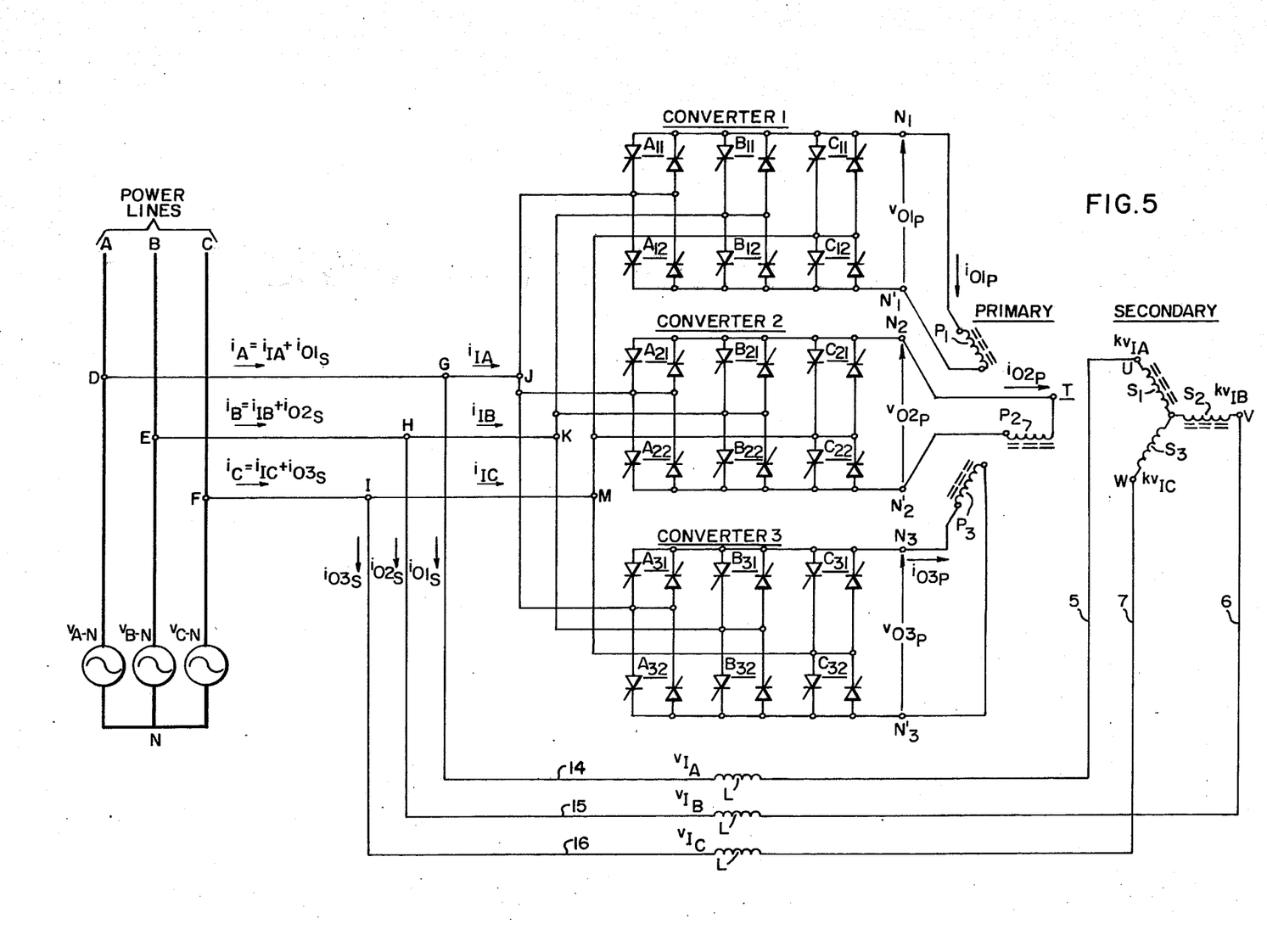
FIG. 5 illustrates the preferred embodiment for carrying out the present invention.

Referring to FIG. 5, the preferred embodiment of the present invention is illustrated by a three-phase six-pulse bridge type unrestricted frequency changer (UFC). A description of the unrestricted frequency changer can be found in U.S. Pat. No. 3,170,107 of R. B. Jessee, and also in U.S. Pat. No. 3,493,838 of L. Gyugyi. Reference also can be had in this regard to the Electronics Engineers Handbook, edited by McGraw Hill Co. in 1975, Section 15 entitled "Power Electronics", and more particularly the subsection on Frequency Changers therein, by Laszlo Gyugyi.

The unrestricted frequency changer can be defined as a converter in which a plurality of controlled bilateral switches are operated in a repetitive switching pattern at a chosen repetition rate to apply successive increments of alternating voltages from a polyphase source to an output circuit to provide an output frequency which is a function of the difference between the input frequency and the repetition rate of switching. The switches are turned ON at a selected time and are turned OFF at a chosen time, the latter being varied to change the conduction duty cycle of each bilateral switch so as to vary the output voltage of the frequency changer. The said selected time and chosen time are both varied concurrently so that the conduction duty cycle be varied as a function of the output frequency.

FIG. 5 shows the frequency changer connected at D,E,F to the respective phases (A,B,C) of a power system. It includes three converters (1, 2 and 3) each having six bilateral switches ($A_{11}$, $A_{12}$, $B_{11}$, $B_{12}$, $C_{11}$, $C_{12}$ for converter 1) associated in pairs to the respective terminals $N_1$, $N'_1$, $N_2$, $N'_2$, $N_3$, $N'_3$ of primary windings $P_1$, $P_2$, $P_3$ of an isolation transformer T. The three primary windings are connected in delta. The secondary includes three secondary windings $S_1$, $S_2$, $S_3$ which are WYE-connected about a neutral N and to three output terminals U,V,W. From each open end of the secondary are derived lines 5, 6 and 7, each to one end of an inductor L. The other end of each such inductor is connected by a corresponding line (14,15,16) to one of the input terminals (G,H,I) of the frequency changer, as well as to a corresponding phase line terminal (D,E,F).

The primary voltages of transformer T are the output voltages $v_{o1p}$, $v_{o2p}$, $v_{o3p}$ of the respective converters 1, 2, 3, the primary currents being $i_{o1p}$, $i_{o2p}$, $i_{o3p}$, respectively. The values of voltages $v_{o1_p}$, $v_{o2_p}$, $v_{o3_p}$ are established by controlling the time of conduction of the bilateral switches in relation to the input voltages $v_{IA}$, $v_{IB}$, $v_{IC}$ of the frequency changer. Thus, according to the definition of $k$ given hereabove, the voltages appearing at the output terminals of the frequency changer (U,V,W) are $kv_{IA}$, $kv_{IB}$, $kv_{IC}$.

The amplitudes of the output voltages $v_{o1p}$, $v_{o2p}$, and $v_{o3p}$ are approximately equal to the amplitudes of the line-to-line voltages, the reduction factor being $(3/\pi)$. These voltages are stepped down by the output transformer T to match approximately the amplitudes of the line-to-neutral voltages $v_{AN}$, $v_{BN}$, $v_{CN}$. The secondaries of the transformer are connected to the AC lines A,B,C via three inductors L, as shown.

The operation of the apparatus of FIG. 5 is described hereinafter with reference to FIG. 6.

Figure 6:
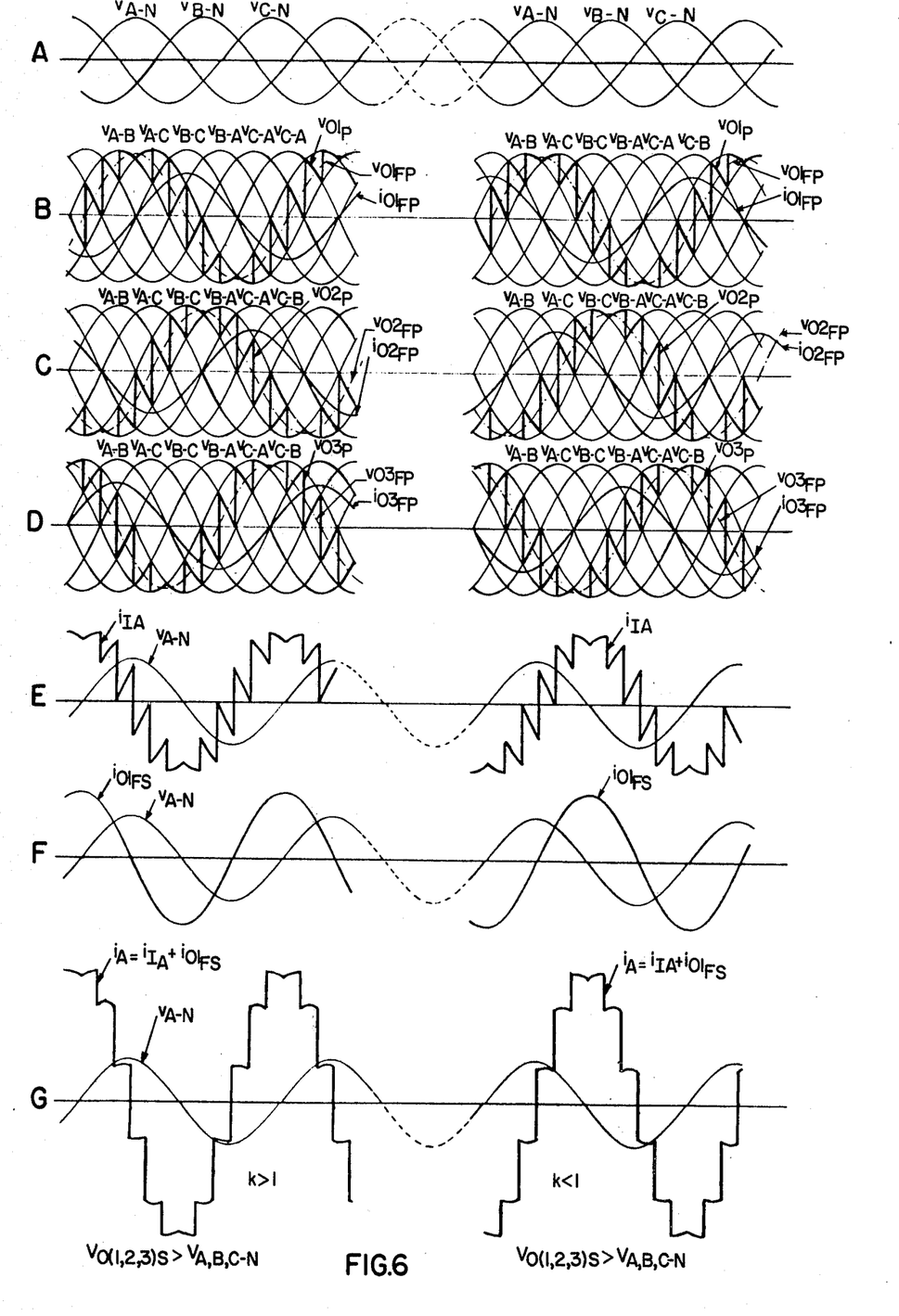
FIG. 6 shows waveforms illustrating the operation of the static reactive power generating apparatus typically shown by FIG. 5.

The line-to-neutral voltages $v_{A-N}$, $v_{B-N}$ and $v_{C-N}$ of the AC source are shown by waves A in FIG. 6. The UFC is operated so that output voltage waves, $v_{o1p}$, $v_{o2p}$ and $v_{o3p}$ (shown by Curves B, C and D in FIG. 6) are in phase with voltages $v_{A-N}$, $v_{B-N}$ and $v_{C-N}$. This is achieved simply by synchronizing the gate pulses (which control the ON-OFF intervals of the semiconductor switches in the frequency changer) in relation to switches $A_{11}$ and $B_{12}$, $C_{21}$ and $A_{22}$, $B_{31}$ and $C_{32}$ so that conduction occurs at instants of zero-crossing of the line-to-neutral voltage $v_{C-N}$. The conduction interval for any switch combination is 1/12 of the period time (i.e., for a 60 Hz supply, it is $1/12 \times 1/60$ sec, or 30 electrical degrees and, for an individual switch, it is 1/6 of the period time, or 60 electrical degrees). Thus, after a 30 degree conduction interval, i.e., when the line-to-line voltage $V_{B-C}$ crosses zero, the following switches are made to conduct: $A_{11}$ and $C_{12}$, $C_{21}$ and $B_{22}$, $B_{31}$ and $A_{32}$, and so on.

Let us assume first that the amplitudes of the fundamental components of the three output voltage waves are somewhat greater than those of the line-to-neutral voltages, e.g. $k > 1$. This case appears on the left side of FIG. 6 where a lagging reactive current flows from each output phase of the frequency changer to the corresponding phases of the AC source. However, this current is "seen" leading with respect to the power line voltages. The fundamental components of the three lagging output currents, $i_{o1_{Fp}}$, $i_{o2_{Fp}}$, $i_{o3_{Fp}}$ (Curves on B, C and D in FIG. 6), at the primary side of the output transformer T, closely approximate the currents $i_{o1_s}$, $i_{o2_s}$, $i_{o3_s}$ flowing in the secondary of transformer T. The input current, $i_{IA}$, of the frequency changer is illustrated together with the corresponding line-to-neutral voltage $v_{A-N}$, by the waveforms E on the left side of FIG. 6. It is seen that the input current $i_{IA}$ leads the corresponding voltage $v_{A-N}$. It is evident that $I_{IB}$ and $I_{IC}$ also lead $v_{B-N}$ and $v_{C-N}$, respectively.

The fundamental output current, $i_{01_{FS}}$ of the frequency changer at the secondary side of the transformer, which flows into input phase A, is shown together with the corresponding voltage $v_{A-N}$ by waves F on the left-hand side of FIG. 6. As previously established, and as illustrated for input phase A, the output currents also lead the corresponding voltages of the AC source. Referring to FIG. 6 (waveforms E, F, G) it is seen that the current $i_A$ flowing in junction G of FIG. 5 correspond to the graphical summation of the waveforms $i_{IA}$ and $i_{01_S}$ e.g. ($i_A = i_{IA} + i_{01_{FS}}$). Similarly, in each of the other AC lines (junction points H and I of FIG. 5) flows a current which is the sum of the corresponding input and output currents.

It is clear that the total current flowing in each line is approximately twice as large as the current waves "flowing through" the frequency changer. Therefore, a frequency changer of half the required rating can be employed to provide variable leading reactive power (VA) up to the full power required.

The operation of the proposed system can be similarly described by reference to the right hand side of FIG. 6 in the case when $k < 1$. In this case, the converter provides lagging reactive VA to the power lines, and $i_A$, for instance, lags the applied voltage. For this mode of operation the amplitudes of the output voltages of the frequency changer at the secondary side of the output transformer are made lower than those of the line-to-neutral supply voltages. The operation for $k < 1$ is illustrated by the right hand side of FIG. 6, and can be explained readily in analogy to the left hand side, and the same conclusion can be drawn as to reactive power doubling effect of the U.F.C. according to the present invention.

Figure 7:
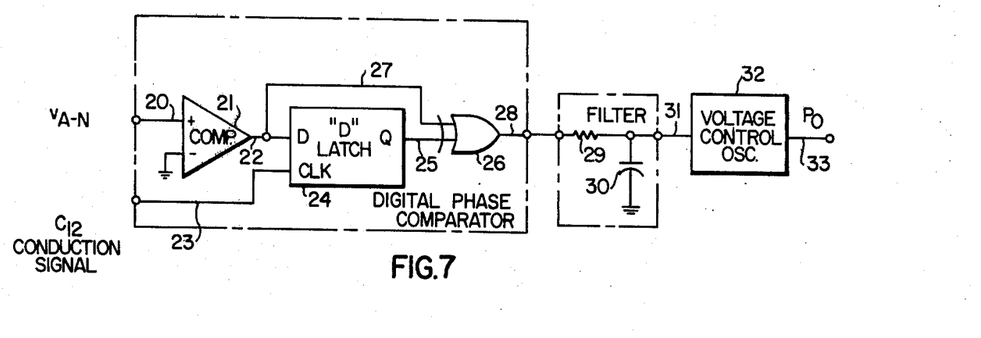
FIG. 7 typifies circuitry for synchronizing the input frequency of the apparatus of FIGS. 5 and 6 with the frequency of the power system.
Figure 8:
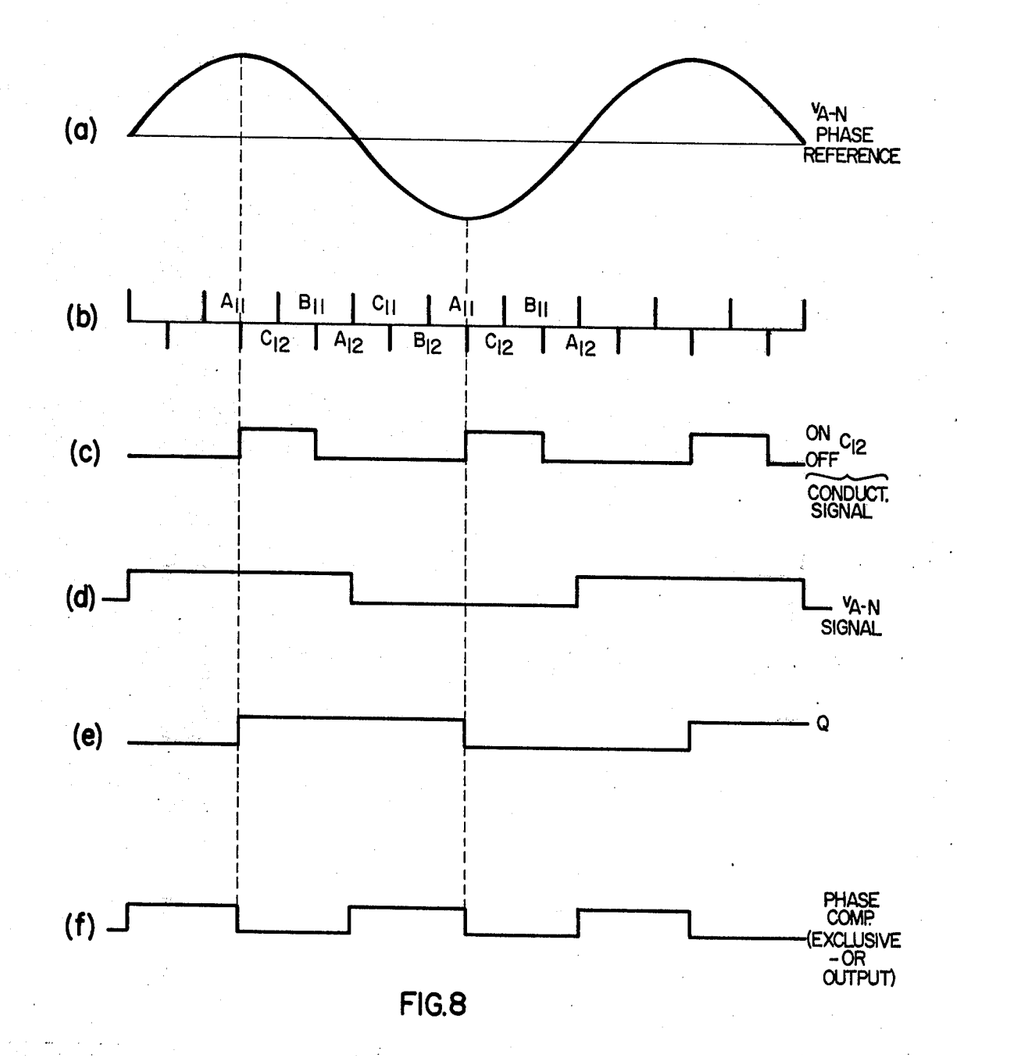
FIG. 8 shows curves illustrating the operation of the circuit of FIG. 7.

While voltage control determines the value of $k$, operation of the U.F.C. at the frequency of the power system, according to the present invention, requires synchronization with the waves in the power lines. Referring to FIG. 7 a block diagram is shown of a circuitry that can be used for providing a frequency control signal $p_o$, for the frequency changer according to the invention, which is automatically locked to the voltage-to-neutral wave $v_{A-N}$ of the power line serving as a reference voltage. Referring to FIG. 8 curve (a) is the $v_{A-N}$ wave form representing the input signal on line 20 to the comparator 21 of FIG. 7. Curve (d) of FIG. 8 shows the output signal of comparator 21 on line 22 which is digital representation of $v_{A-N}$ centered on the peaks of the sinusoidal waveform. From FIG. 6 it is observed that each thyristor (see $A_{11}$, $B_{11}$, ... $A_{12}$, $B_{12}$ ... in FIG. 5) conducts during a time interval corresponding to 60° of the input frequency, for instance of $v_{A-N}$, if phase A is taken as reference line. Conduction between the successive thyristors overlaps by 30 degrees. Thus, conduction of thyristor $C_{12}$ lags conduction of thyristor $A_{11}$ by 30°. In FIG. 8 waveform (b) represents the firing pulses determining the various conduction time intervals. Curve (c) represents in digital form the period of conduction of thyristor $C_{12}$. Accordingly, the leading edge of $C_{12}$ represents the middle of the conduction state of $A_{11}$. In order to synchronize the input of the frequency changer it is necessary to synchronize the commencing of the conduction of $C_{12}$ with the peak of $v_{A-N}$. To achieve this, digital signal $C_{12}$ is fed on line 23 as a clock signal to a D latch device 24, the D input being connected by line 22 to receive the $v_{A-N}$ digital signal (d). The Q output of device 24 is set into the D state when the clock pulse is positive. Therefore at the output 25 (FIG. 7) a signal Q such as shown by (e) in FIG. 8 is derived. An Exclusive-OR device 26 selects the opposite state on lines 25 and 27, providing on line 28 at the output the signal shown by curve (f). After integration through a filter network 29, 30 the mean level which is equal to half the logic supply voltage on line 28 is fed to a voltage controlled oscillator 32 which generates a frequency control signal $p_o$ (on line 33) which is automatically maintained at the desired frequency, that is, a multiple of the input frequency of the reference voltage $v_{A-N}$, namely 12 times in the instance of the six-pulse U.F.C. of FIG. 6.

The operation of the circuit of FIG. 7 is as follows: When $A_{11}$ (curve (b)) deviates about the peak of voltage $v_{A-N}$ (curve (a)), $C_{12}$ (curve (c)) also deviates and so does the edge of curve (e) relative to the middle of the reference digital curve (d). Therefore the high and low levels of signal (f) are no longer of equal duration and the signal on line 31 acquires a voltage above or below the "no control" level, thereby to bring $p_o$ at the right frequency on line 33. Referring now to U.S. Pat. No. 3,493,838 of L. Gyugyi et al., issued Feb. 3, 1970 entitled "Static Frequency Converter With Novel Voltage Control" and, which for the purpose of the description of voltage and frequency control is hereby incorporated by reference, signal $p_o$ (as obtained with the circuit of FIG. 7 herein) is fed into the control circuit of the frequency changer as shown in FIG. 7 of the above-mentioned Gyugyi patent and in accordance with the curves of FIG. 6A also shown in the above-mentioned Gyugyi patent.

It is observed that in this second mode, i.e., when the the system provides lagging VA for the supply, the switches are under such voltage conditions that the frequency changer can be "naturally commutated". This can be readily established on the basis of waveforms B, C and D of FIG. 6 (right-hand side) by noting that the "incoming" voltage is always more positive than the "outgoing" one during the positive current half cycle, and this relationship reverses during the negative current half cycle. Consequently, a Naturally Commutated Cycloconverter (NCC) of half the required rating (P.U.) can be employed to provide variable lagging reactive power (VA) up to the final maximum required power (1 P.U.) for the AC power source. The naturally commutated cycloconverter, operating under conditions similar to those stated hereabove in accordance with the present invention, will be controlled for a proper selection of $k$ by one of the known methods of varying the conduction intervals of the thyristors, for instance the cosine wave crossing method in response to a reference voltage, or the integral firing control method, the latter described in U.S. Pat. No. 3,585,485 of L. Gyugyi.

The basic system described can be modified in various ways to make it still more economical and to widen the field of applications.

Modified versions of the two basic systems employing a UFC and an NCC are shown in FIGS. 9A, 9B and 10A, 10B, respectively. The purpose of these embodiments is to increase the leading VA capacity of the system, without changing the VA rating in the case of an unrestricted frequency changer (UFC), at the expense of relinquishing the lagging VA capacity; or, to be able to provide leading rather then merely lagging VA in the case of a naturally commutated system as inherent to such converter.

Figure 9A:
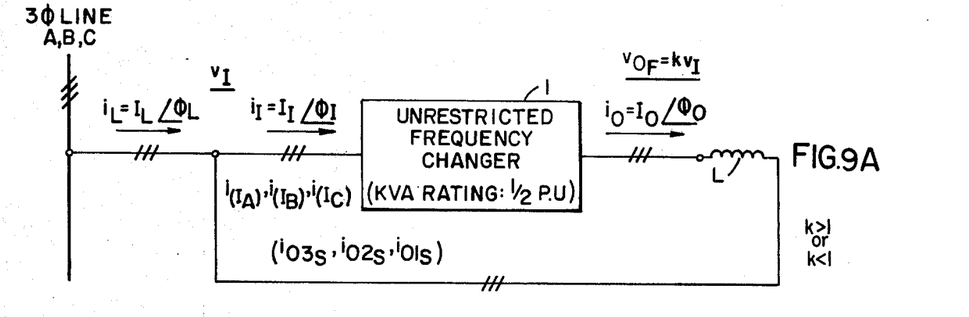
FIGS. 9A and 9B provide a schematic representation of an unrestricted frequency changer such as shown in FIGS. 5 and 6, for two different modes of utilization.

The basic static synchronous condenser scheme utilizing an "Unrestricted Frequency Changer" is shown by the circuit diagram of FIG. 9A. The operating characteristics are summarized in Table I as follows:

Table I

| | (Fig. 9A) | | | | | |
|---|---|---|---|---|---|---|
| k | $I_o$ | $\phi_o$ | $I_I$ | $\phi_I$ | $I_L$ | $\phi_L$ |
| $k_{max}>1$ | ½ P.U. | +90° | ½ P.U. | +90° | 1 P.U. | +90° |
| $k_{min}<1$ | ½ P.U. | −90° | ½ P.U. | −90° | 1 P.U. | −90° |
| 1 | 0 | | 0 | | 0 | |

The principal feature of this system is that 1 P.U., leading and lagging, VAR can be provided by the static system rated for ½ VA throughput.

Figure 9B:
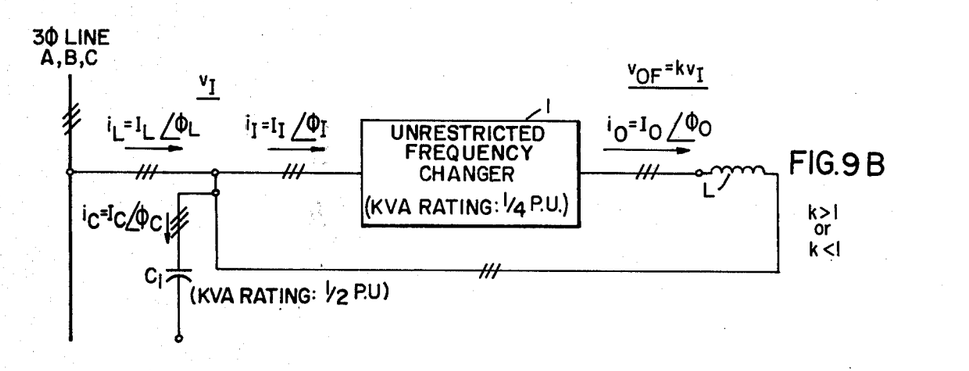

A modified version is shown in FIG. 9B. The operating characteristics are summarized in Table II as follows:

Table II

| | (FIG. 9B) | | | | | | | |
|---|---|---|---|---|---|---|---|---|
| k | $I_o$ | $\phi_o$ | $I_I$ | $\phi_I$ | $I_C$ | $\phi_C$ | $I_L$ | $\Phi_L$ |
| $k_{max}>1$ | ¼ P.U. | +90° | ¼ P.U. | +90° | ½ P.U. | +90° | 1 P.U. | +90° |
| $k_{min}<1$ | ¼ P.U. | −90° | ¼ P.U. | −90° | ½ P.U. | +90° | 0 | |
| 1 | 0 | | 0 | | ½ P.U. | +90° | ½ P.U. | +90° |

This hybrid arrangement can provide up to 1 P.U. leading VAR, with the rating (throughput) of the frequency changer decreased to ¼ P.U. The basic idea is to connect fixed capacitor banks $C_1$ of ½ P.U. VA rating to the lines. The frequency changer itself, having a VA rating of ¼ P.U. (throughput) can provide ½ P.U. lagging and leading VAR. Thus the frequency changer is used either to cancel (by providing lagging VAR) some or all of the leading VAR supplied by the fixed capacitor $C_1$, or to boost it (by also providing leading VAR).

Figure 10A:
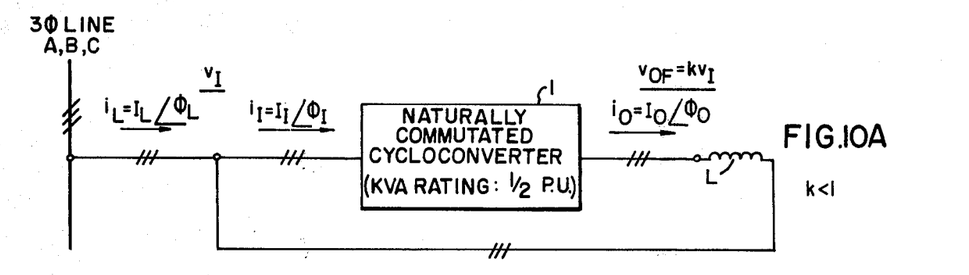
FIGS. 10A and 10B provide a schematic representation of a naturally commutated cycloconverter in two different modes of utilization as a static reactive power generating apparatus according to the present invention.
Figure 10B:
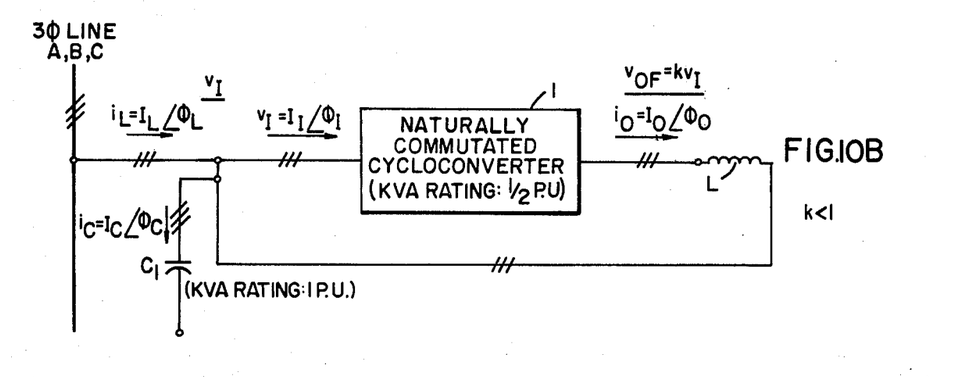

Similarly, a basic and a modified version of the static scheme using a Naturally Commutated Cycloconverter (NCC) are shown in FIGS. 10A and 10B, respectively. The operating characteristics are also given in tabulated form as follows:

Table III

| | (Fig. 10A) | | | | | |
|---|---|---|---|---|---|---|
| k | $I_o$ | $\phi_o$ | $I_I$ | $\phi_I$ | $I_L$ | $\phi_L$ |
| k>1 | C A N N O T B E O P E R A T E D | | | | | |
| $k_{min}<1$ | ½ P.U. | −90° | ½ P.U. | −90° | 1 P.U. | −90° |
| 1 | 0 | | 0 | | 0 | |

Table IV

| | (Fig. 10B) | | | | | | | |
|---|---|---|---|---|---|---|---|---|
| k | $I_o$ | $\phi_o$ | $I_I$ | $\phi_I$ | $I_C$ | $\phi_C$ | $I_L$ | $\phi_L$ |
| k>1 | C A N N O T B E O P E R A T E D | | | | | | | |
| $k_{min}<1$ | ½ P.U. | −90° | ½ P.U. | −90° | 1 P.U. | +90° | 0 | |
| 1 | 0 | | 0 | | 1 P.U. | +90° | 1 P.U. | +90° |

As was previously explained, the naturally commutated system can provide only lagging VAR. Thus, the naturally commutated system acts, essentially, as a variable inductor.

The modified hybrid version, however, provides controllable leading VAR. The idea is again to connect fixed capacitor banks $C_1$ having a rating of one VA per unit (1 P.U.) to the lines, and to use the naturally commutated system (½ P.U. throughput) to cancel in a controllable fashion, some (or all) of the fixed capacitive VAR ($C_1$). Thus, a system comprising a fixed capacitor $C_1$ (with a VA rating of 1 P.U.) and a Naturally Commutated Cycloconverter (with a VA rating of ½ P.U.) can provide zero to 1 P.U. continuously variable leading VAR for the power lines.

For an overall review of the structural features and operative modes of static frequency changers reference is made to "Thyristor Phase-Controlled Converters and Cycloconverters" by B. R. Pelly, published 1971 by John Wiley & Sons.

We claim:

1. A reactive power generator coupled to an alternating current power system of given frequency including at least one alternating voltage source and a load, comprising:

a static frequency converter havng input and output terminals and including a plurality of controllable static switching devices connected between said input and output terminals, said input terminals being connected to said alternating current power system;

impedance means connected between said output terminals and said input terminals; and control means for turning said static switching devices ON and OFF selectively and sequentially at predetermined instants of time to connect said input terminals to said output terminals in predetermined sequence for predetermined time intervals, and to derive at said output terminals an alternating voltage wave resulting from selected segments of the alternating voltage wave of said alternating current power system, with said output terminal voltage wave having the same frequency as said power system voltage wave and having a difference in magnitude from the voltage of said power system voltage wave in an amount determined by said control means so that an alternating reactive input current flows from said alternating current power system into said input terminals and an alternating reactive output current flows from said output terminals into said alternating current power system through said impedance means the phase angle between said alternating reactive input current and the associated power system alternating voltages wave being opposite to the phase angle between said alternating reactive output current and the associated output terminal alternating voltage wave, whereby said reactive input current and said reactive output current are summed up directly at said input terminals to supply reactive power to said alternating current power system in an amount which is twice the volt-ampere throughput of said reactive power generator, the nature and amount of said supplied reactive power being determined by said voltage difference.

2. The generator of claim 1 with said impedance means consisting of inductance means; and
with said frequency converter including transformer means for establishing a predetermined difference in the magnitudes between said output terminals voltage wave and said power system voltage wave; said control means having a range of control including said predetermined difference.

3. The generator of claim 2 with said frequency converter including an unrestricted frequency changer, said controlling means operative with a one-to-one frequency ratio and to vary said output voltage magnitude above and below the magnitude of said input voltage.

4. The generator of claim 2 with said frequency converter including a naturally commutated cycloconverter; said control means being operative to vary the magnitude of said output voltage below the voltage of said power system voltage wave.

5. The generator of claim 2 including an auxiliary source of reactive power having a predetermined VAR characteristic, said auxiliary source being connected to said power system together with said frequency converter, so as to sum the reactive power of said auxiliary source and that of said frequency converter.

6. The generator of claim 5 with said auxiliary source providing a predetermined amount of capacitive VA power to increase the reactive power capability of said frequency converter in the leading direction.

7. The generator of claim 5 with said auxiliary source providing a predetermined amount of inductive VA power to increase the reactive power capability of said converter means in the lagging direction.

* * * * *